(12) United States Patent
Patel et al.

(10) Patent No.: US 12,160,629 B2
(45) Date of Patent: Dec. 3, 2024

(54) METHODS AND SYSTEMS FOR PROVIDING PRIMARY CONTENT AND SECONDARY CONTENT

(71) Applicant: Comcast Cable Communications, LLC, Philadelphia, PA (US)

(72) Inventors: Mehul Patel, Centennial, CO (US); Edward David Monnerat, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/789,517

(22) Filed: Jul. 1, 2015

(65) Prior Publication Data

US 2017/0006335 A1    Jan. 5, 2017

(51) Int. Cl.
*H04N 21/436* (2011.01)
*H04N 21/41* (2011.01)
(Continued)

(52) U.S. Cl.
CPC ... *H04N 21/43615* (2013.01); *H04N 21/4122* (2013.01); *H04N 21/4126* (2013.01);
(Continued)

(58) Field of Classification Search
CPC ........... H04N 21/43615; H04N 21/812; H04N 21/218; H04N 21/4122; H04N 21/42684; H04N 21/44016; H04N 21/2665; H04N 21/4126; H04N 21/2365; H04N 21/25816; H04N 21/25875; H04N 21/4532; H04N 21/4784; H04N 7/162; H04N 21/44222; H04N 21/44231; H04N 21/44218; H04N 21/4622; H04N 21/235; H04N 21/23424;
(Continued)

(56) References Cited

U.S. PATENT DOCUMENTS 8,516,533 B2    8/2013 Davis et al.
8,806,530 B1 *  8/2014 Izdepski ............ H04N 21/4126
                                                  725/141
(Continued)

FOREIGN PATENT DOCUMENTS

WO    WO-2010015991 A2 *  2/2010  ..... H04N 21/234309
WO    WO-2012150972 A1 *  11/2012  ......... G06Q 30/0241

OTHER PUBLICATIONS

Aquino, Judith, 'Angry Birds' Maker Dives Deeper Into Video and Native Ads, Eyes Programmatic Direct, AdExchanger.com, Apr. 17, 2014 (accessed on Aug. 4, 2014) (available at: http://www.adexchanger.com/mobile/angry-birds-maker-dives-deeper-into-video-and-native-ads-eyes-programmatic-direct) (4 pages).

*Primary Examiner* — John W Miller
*Assistant Examiner* — Aksahy Doshi
(74) *Attorney, Agent, or Firm* — Ballard Spahr LLP

(57) ABSTRACT

Primary content can be provided to a first device, wherein the primary content can comprise at least a first portion and a second portion. A provider can determine a user parameter related to secondary content, interspersed with the first and second portions of the primary content, and can provide the secondary content to a second device instead of to the first device, based on the user parameter. The provider can provide the second portion of the primary content to the first device immediately following the first portion of the primary content.

26 Claims, 6 Drawing Sheets

(51) Int. Cl.
  *H04N 21/44* (2011.01)
  *H04N 21/442* (2011.01)
  *H04N 21/462* (2011.01)
  *H04N 21/81* (2011.01)

(52) U.S. Cl.
  CPC .. *H04N 21/44016* (2013.01); *H04N 21/44218* (2013.01); *H04N 21/44231* (2013.01); *H04N 21/4622* (2013.01); *H04N 21/812* (2013.01)

(58) Field of Classification Search
  CPC ......... H04N 21/26241; H04N 21/4316; H04N 5/2723; G06Q 30/0207; G06Q 30/0241; G06Q 30/02; G06Q 30/0273; G06Q 30/0274
  See application file for complete search history.

(56) References Cited

U.S. PATENT DOCUMENTS

| | | | | |
|---|---|---|---|---|
| 9,491,522 | B1* | 11/2016 | Trollope | H04N 21/436 |
| 2001/0054181 | A1* | 12/2001 | Corvin | G06Q 30/02 |
| | | | | 725/42 |
| 2002/0138831 | A1* | 9/2002 | Wachtfogel | H04N 5/76 |
| | | | | 725/32 |
| 2008/0172243 | A1* | 7/2008 | Kelly | G06Q 30/0251 |
| | | | | 705/14.49 |
| 2008/0301743 | A1* | 12/2008 | Vrielink | H04L 12/2803 |
| | | | | 725/110 |
| 2009/0150553 | A1* | 6/2009 | Collart | H04L 65/612 |
| | | | | 709/229 |
| 2010/0125868 | A1* | 5/2010 | Foladare | H04N 21/41407 |
| | | | | 725/32 |
| 2011/0166917 | A1* | 7/2011 | Shang | G06Q 30/02 |
| | | | | 705/14.7 |
| 2011/0289532 | A1 | 11/2011 | Yu et al. | |
| 2013/0173394 | A1* | 7/2013 | Birch | H04N 21/4532 |
| | | | | 705/14.66 |
| 2013/0173765 | A1* | 7/2013 | Korbecki | H04N 21/42209 |
| | | | | 709/221 |
| 2013/0174188 | A1 | 7/2013 | Gagnon et al. | |
| 2013/0205316 | A1 | 8/2013 | Sinha et al. | |
| 2013/0340011 | A1 | 12/2013 | Rodriguez | |
| 2014/0037132 | A1 | 2/2014 | Heen et al. | |
| 2014/0088975 | A1* | 3/2014 | Davis | H04W 12/02 |
| | | | | 704/500 |
| 2015/0067714 | A1* | 3/2015 | Bhogal | H04N 21/812 |
| | | | | 725/25 |
| 2015/0312622 | A1* | 10/2015 | Candelore | H04N 21/4722 |
| | | | | 725/37 |
| 2015/0363837 | A1* | 12/2015 | Lewis | G06Q 30/0264 |
| | | | | 705/14.61 |
| 2016/0094893 | A1* | 3/2016 | Tse | H04N 21/25875 |
| | | | | 725/32 |

* cited by examiner

METHODS AND SYSTEMS FOR PROVIDING PRIMARY CONTENT AND SECONDARY CONTENT

BACKGROUND

Current content delivery systems typically provide content and associated advertising in a single transmission to a single screen. Advertisements are shown in-line or back to back with the main content so that if a user is watching content on a television, advertisements are also shown on that television at scheduled advertisement breaks. Similarly, if a user is watching video-on-demand content on a tablet device, advertisements are shown on that tablet device at scheduled advertisement breaks. Some users may find the breaks in content created by the displayed advertisements disrupting, or may simply desire to view the advertisements on a different device and/or at a different time. These and other shortcomings are addressed by the disclosed methods and systems.

SUMMARY

It is to be understood that both the following general description and the following detailed description are exemplary and explanatory only and are not restrictive. In some aspects, provided are methods and systems for using a second device having display capabilities (such as a tablet computer or smartphone) to display secondary content (e.g., advertising) while continuing to display primary content (e.g., television programming, movies, etc. . . . ) on a primary device (such as a television). In particular, a user can have a second-screen device displaying the secondary content while viewing the primary content that would otherwise be interrupted by the secondary content on a primary device. The secondary content can be packaged to be delivered at pre-determined times within the primary content. According to an aspect of the disclosure, instead of delivering the secondary content in-line, or as packaged or scheduled at the primary device, the secondary content can be provided to the second-screen device, while the primary content continues to play on the primary device. For example, the secondary content can be stored separately from the primary content at the content provider. The content provider can then provide two content streams: a first content stream for transmitting the primary content to the first device and a second content stream for transmitting the secondary content to the second device.

In an aspect, an example method can comprise providing primary content to a first device. The primary content can comprise at least a first portion and a second portion, with secondary content between the first and second portions of the primary content. A content or service provider can determine a user parameter related to secondary content and can provide the secondary content to a second device instead of to the first device, based on the user parameter. The content or service provider can provide the second portion of the primary content to the first device immediately following the first portion of the primary content.

In another aspect provided are methods that can comprise determining an indication of secondary content to be delivered to a first device between portions of primary content. A content or service provider can determine a user parameter related to the secondary content, in response to the indication, and can identify a second device associated with the user parameter. The content or service provider can further determine a proximity of the first device to the second device, and can deliver the secondary content to the second device based on at least the user parameter and the determined proximity. The content or service provider can provide the portions of the primary content without the secondary content to the first device.

In yet another aspect, an example method can comprise determining an indication of secondary content to be delivered to a first device between portions of primary content. A content or service provider can determine a user parameter related to the secondary content and can identify a second device associated with the user parameter. The content or service provider can further determine whether or not the second device is active in response to the indication of secondary content to be delivered, and can deliver the secondary content to the second device based on the user parameter and the determination that the second device is active.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
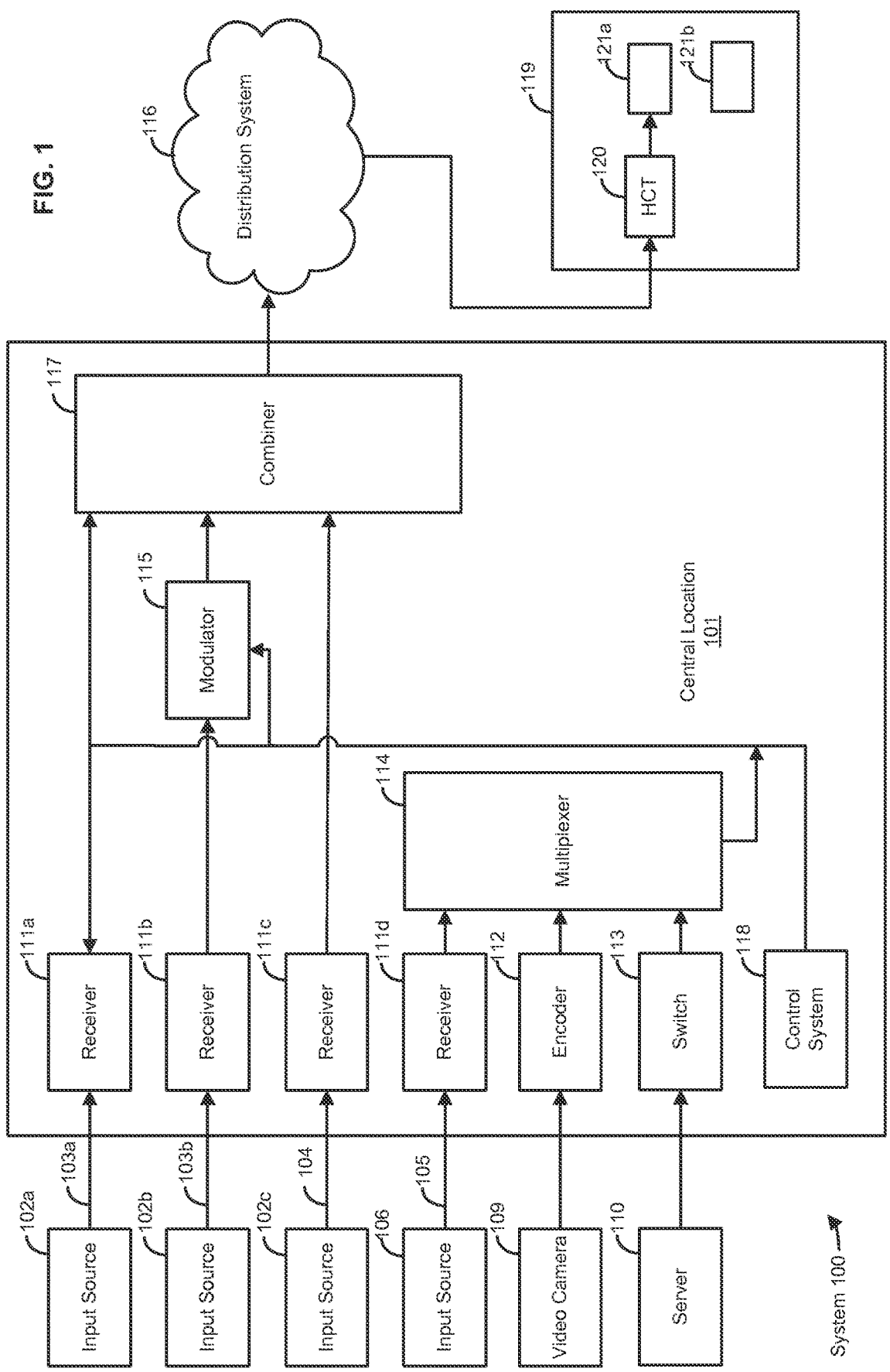
FIG. 1 is a block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for displaying secondary content using a secondary device. Secondary content can comprise, for example, advertisements (interactive and/or non-interactive), and/or supplemental content such as behind-the-scenes footage or other related content. Typically, advertisements are shown in-line with primary content watched by a user. As used herein, in-line can refer to content provided immediately following other content on the same device. As an example, in traditional in-line video, advertising content is inserted at break points in primary content. Similarly, in IP or streaming video, advertising content can be described as in-line when the advertising content is shown between two sequential segments of primary content.

Many users have access to multiple display devices while consuming content. For example, a user may view content on a primary device such as a television or a display connected to a set-top box, but also have access to one or more additional devices such as a tablet computer, laptop computer, smartphone, or the like. Advertisements (or other secondary content) can be provided to these additional devices rather than on the primary device, allowing display of the content to continue on the primary device without interruption. In an aspect, the additional devices must be generally located near the primary device to help prevent a user from designating a device that is too far away from the primary device to assume that the user will consume the content on the secondary device.

FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., video, audio, images, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, such as wireless paths (e.g. satellite paths 103a, 103b) and terrestrial path 104. The central location 101 can also receive content from an input source 106 via a direct line 105. Other input sources can comprise capture devices, such as a video camera 109, a server 110, and/or the like. The content provided by the content sources can comprise a single content item, a portion of a content item (e.g., content fragment), a content stream, a multiplexed stream that includes several content items, and/or the like.

The central location 101 can comprise one or a plurality of receivers 111a, 111b, 111c, 111d that are associated with one or more corresponding input sources. The central location 101 can comprise one or more encoders 112, switches 113, multiplexers, and/or the like. For example, an encoder 112 can compress, encrypt, transform, and/or otherwise encode content. As a further example, the encoder 112 can encode content based on one or more compression standards, such as MPEG. As another example, the encoder can receive content from the video camera 109 and/or other source and apply one or more encoding algorithms to the received content. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer 114.

The central location 101 can comprise one or more modulators 115 for interfacing with a distribution system 116. As an example, a modulator can receive content from a receiver 111, encoder 112, multiplexer 114, and/or the like. A modulator 115 can convert the received content into a modulated output signal suitable for transmission over the distribution system 116. For example, a modulator 115 can map portions of the content to data bits expressed as signals (e.g., sinusoidal signals) at corresponding subcarrier frequencies of a data symbol. The output signals from the modulators 115 can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for a television system, billing for each user, conditional access for content distributed to users, and the like. The control system 118 can provide input to the modulators for setting operating parameters, such as system specific MPEG table packet organization or conditional access information. The control system 118 can be located at central location 101 or at a remote location.

The distribution system 116 can distribute content from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a first display device 121a, such as on a television set (TV) or a computer monitor, which can serve as a first device for display of primary content. The user location 119 further comprises a second display device 121b, such as a smart TV, tablet computer, laptop or personal computer, which can serve as a second device used to display advertising or other secondary content in lieu of displaying the secondary content in-line with the primary content displayed on the first display device 121a. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, display devices 121, central locations 101, DVR's, home theater PC's, and the like.

In an aspect, user location 119 is necessarily not fixed. By way of example, a user can receive content from the distribution system 116 on a mobile device such as a laptop computer, PDA, smartphone, GPS, vehicle entertainment system, portable content player, and the like.

In an exemplary embodiment, the methods and systems disclosed can be located within one or more distribution systems 116 and user locations 119. The distribution system 116 can provide content to user locations 119 such that the content can be identified as primary content (e.g., television programs, movies, etc.) and secondary content (e.g. interactive and non-interactive advertising etc.). In an aspect, the second display device 121b can be capable of two-way communication with the distribution system 116. For example, the second display device 121b and the distribution system 116 can communicate through the HCT 120, or through a wireless router (not shown). In an aspect, the distribution system 116 can direct primary content to the first display device 121a via the HCT 120, and can direct secondary content the second display device 121b. In another aspect, the second display device 121b can communicate directly with the first display device 121a using any known wireless communication standard, such as Wi-Fi and Bluetooth.

Figure 2:
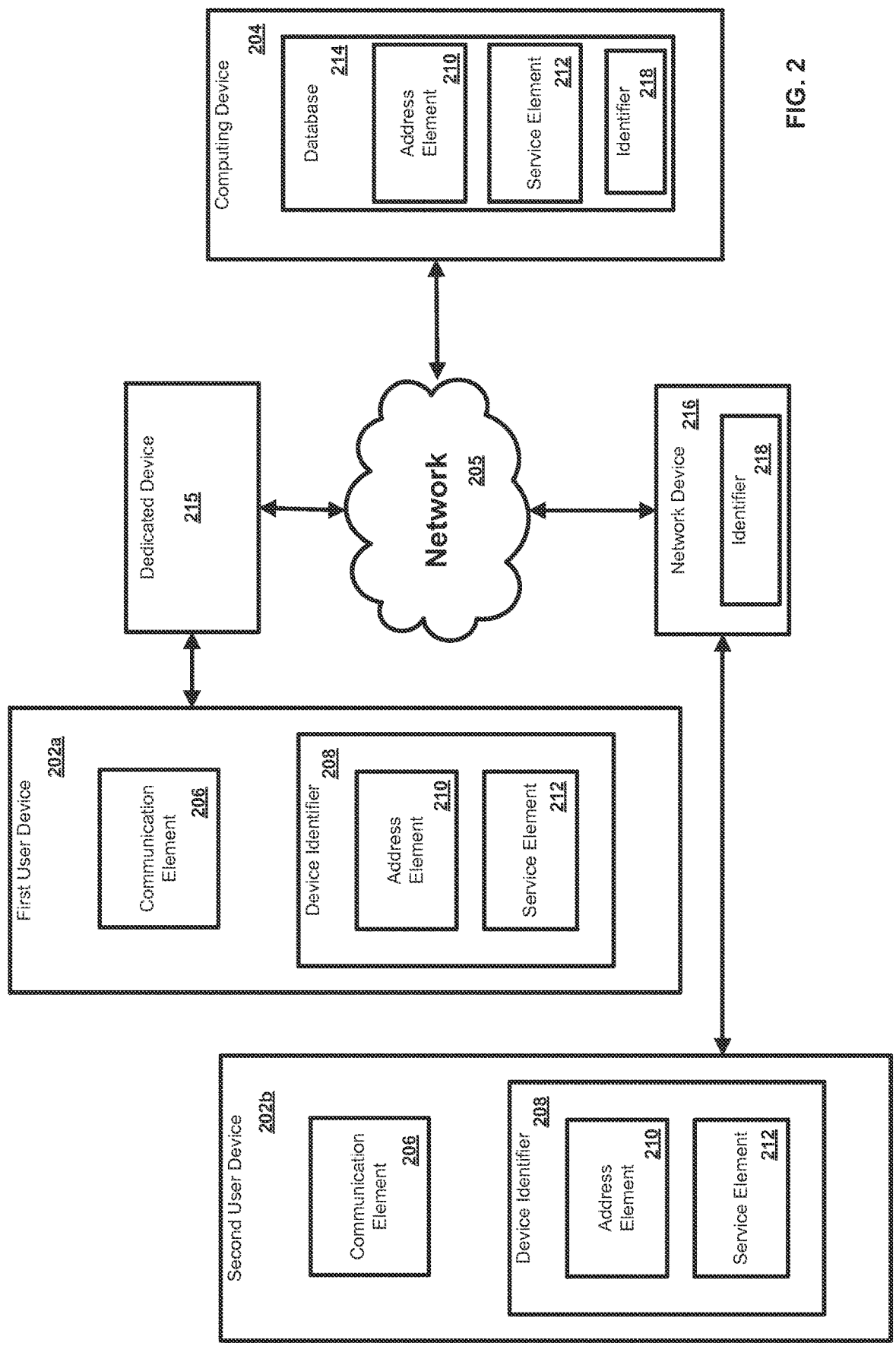
FIG. 2 is a block diagram illustrating various aspects of another exemplary system.

In another aspect of the disclosure, a system can be configured to provide services such as network-related services to a user device. FIG. 2 illustrates various aspects of an exemplary environment in which the present methods and systems can operate. The network and system can comprise a first user device 202a and a second user device 202b in communication with a computing device 204 such as a server or distribution system 116, for example. The computing device 204 can be disposed locally or remotely relative to the user devices 202a,b. As an example, the first and second user devices 202a,b and the computing device 204 can be in communication via a private and/or public network 205 such as the Internet or a local area network. Other forms of communications can be used such as wired and wireless telecommunication channels, for example.

In an aspect, each of the first and second user devices 202a,b can be an electronic device such as a computer, a smartphone, a laptop, a tablet, a set top box, a display device, or other device capable of communicating with the computing device 204. For example, the first user device 202a can serve as a first device for viewing primary content (e.g., television shows, movies, etc.), while the second user device 202b can serve as a device for viewing secondary content (e.g. interactive and non-interactive advertisements, etc.) that has been provided to the second user device 202b in lieu of the first user device 202a. As an example, the first and second user devices 202a,b can each comprise a communication element 206 for providing an interface to a user to interact with the first and second user devices 202a,b and/or the computing device 204. The communication element 206 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the first and second user devices 202a,b and the computing device 204. As an example, the communication element 206 can request or query various files from a local source and/or a remote source. As a further example, the communication element 206 can transmit data to a local or remote device such as the computing device 204. In an aspect, the communication element 206 of the first user device 202a and the communication element 206 of the second user device 202b can be used to establish direct communication between the first user device 202a and the second user device 202b, using known wired or wireless communications standards.

In an aspect, each of the first and second user devices 202a,b can be associated with a user identifier or device identifier 208. As an example, the device identifier 208 can be any identifier, token, character, string, or the like, for differentiating one user or user device (e.g., first user device 202a) from another user or user device (e.g., second user device 202b). In a further aspect, the device identifier 208 can identify a user or user device as belonging to a particular class of users or user devices. As a further example, the device identifier 208 can comprise information relating to the user device such as a manufacturer, a model or type of device, a service provider associated with the first and second user devices 202a,b, a state of the first and second user devices 202a,b, a locator, and/or a label or classifier. Other information can be represented by the device identifier 208.

In an aspect, the device identifier 208 can comprise an address element 210 and a service element 212. In an aspect, the address element 210 can comprise or provide an internet protocol address, a network address, a content access control (MAC) address, an Internet address, or the like. As an example, the address element 210 can be relied upon to establish a communication session between the first and second user devices 202a,b and the computing device 204 or other devices and/or networks. As a further example, the address element 210 can be used as an identifier or locator of the first and second user devices 202a,b. In an aspect, the address element 210 can be persistent for a particular network.

In an aspect, the service element 212 can comprise an identification of a service provider associated with each user device 202a,b and/or with the class of each of the first and second user devices 202a,b. The class of the first and second user devices 202a,b can be related to a type of device, capability of device, type of service being provided, and/or a level of service (e.g., business class, service tier, service package, etc.). As an example, the service element 212 of the first user device 202a can comprise information indicating that the device is a first device for viewing primary content, and the service element 212 of the second user device 202b can comprise information indicating that the device is a second device for viewing secondary content. As another example, the service element 212 can comprise information relating to or provided by a communication service provider (e.g., Internet service provider) that is providing or enabling data flow such as communication services to one or both of the first and second user devices 202a,b. As a further example, the service element 212 can comprise information relating to a preferred service provider for one or more particular services relating to one or both of the first and second user device 202a,b. In an aspect, the address element 210 can be used to identify or retrieve data from the service element 212, or vice versa. As a further example, one or more of the address element 210 and the service element 212 can be stored remotely from the first and second user devices 202a,b and retrieved by one or more devices such as the first and second user devices 202a,b and the computing device 204. Other information can be represented by the service element 212.

In an aspect, the computing device 204 can be a server for communicating with the first and second user devices 202a,b. As an example, the computing device 204 can communicate with the first and second user devices 202a,b for providing data and/or services (e.g., primary and secondary content). As an example, the computing device 204 can provide services such as network (e.g., Internet) connectivity, network printing, content management (e.g., content server), content services, streaming services, broadband services, or other network-related services. As a further example, the computing device 204 can provide content, such as primary content and/or secondary content, to the first and second user devices 202a,b. In particular, the computing device 204 can provide primary content and/or secondary content to the first user device 202a. In an aspect, the secondary content that the computing device 204 would normally provide to the first user device 202a between portions of primary content can instead be provided to the second user device 202b. In an aspect, the computing device 204 can allow one or more of the first and second user devices 202a,b to interact with remote resources such as data, devices, and files. As an example, the computing device can be configured as (or disposed at) a central location (e.g., a headend, or processing facility), which can receive content (e.g., data, input programming) from multiple sources. The computing device 204 can combine the content from the multiple sources and can distribute the content to user (e.g., subscriber) locations via a distribution system.

In an aspect, the computing device 204 can communicate with the first user device 202a via a dedicated device 215, such as a set-top box or other computing device. For example, the dedicated device 215 can facilitate two-way communication between the first user device 202a and the computing device 204.

In an aspect, the computing device 204 can manage the communication between the first and second user devices 202a,b and a database 214 for sending and receiving data therebetween. As an example, the database 214 can store a plurality of files (e.g., web pages), user identifiers or records, or other information. As a further example, the user devices 202a,b can request and/or retrieve a file from the database 214. In an aspect, the database 214 can store information relating to the first and second user devices 202a,b such as the address element 210 and/or the service element 212. As an example, the computing device 204 can obtain the device identifier 208 from the first and second user devices 202a,b and retrieve information from the database 214 such as the address element 210 and/or the service elements 212. As a further example, the computing device 204 can obtain the address element 210 from the user device 202a,b and can retrieve the service element 212 from the database 214, or vice versa. Any information can be stored in and retrieved from the database 214. The database 214 can be disposed remotely from the computing device 204 and accessed via direct or indirect connection. The database 214 can be integrated with the computing system 204 or some other device or system.

In an aspect, one or more network devices 216 can be in communication with a network such as network 205. As an example, one or more of the network devices 216 can facilitate the connection of a device, such as the second user device 202b, to the network 205. In an aspect, one or more network devices 216 can optionally facilitate connection of the first user device 202a to the network 205. Accordingly, the first user device 202a can optionally communicate with the second user device 202b through the one or more network device 216. As a further example, one or more of the network devices 216 can be configured as a wireless access point (WAP). In an aspect, one or more network devices 216 can be configured to allow one or more wireless devices to connect to a wired and/or wireless network using Wi-Fi, Bluetooth or any desired method or standard.

In an aspect, the network devices 216 can be configured as a local area network (LAN). As an example, one or more network devices 216 can comprise a dual band wireless access point. As an example, the network devices 216 can be configured with a first service set identifier (SSID) (e.g., associated with a user network or private network) to function as a local network for a particular user or users. As a further example, the network devices 216 can be configured with a second service set identifier (SSID) (e.g., associated with a public/community network or a hidden network) to function as a secondary network or redundant network for connected devices.

In an aspect, one or more network devices 216 can comprise an identifier 218. As an example, one or more identifiers can be or relate to an Internet Protocol (IP) Address IPV4/IPV6 or a content access control address (MAC address) or the like. As a further example, one or more identifiers 218 can be a unique identifier for facilitating communications on the physical network segment. In an aspect, each of the network devices 216 can comprise a distinct identifier 218. As an example, the identifiers 218 can be associated with a physical location of the network devices 216.

Figure 3:
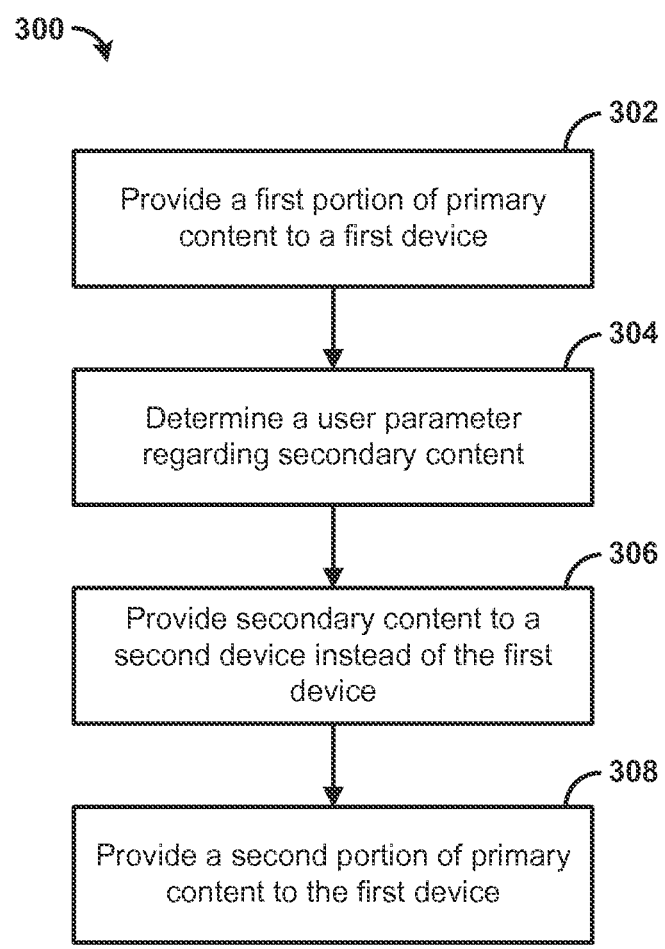
FIG. 3 is a flowchart illustrating an example method.

FIG. 3 is a flowchart illustrating an exemplary method 300. At step 302, a content or service provider can provide primary content to a first device. In an aspect, the first device can be associated with a user. For example, the user can be "logged in" on the first device. In an aspect, the content provider can utilize one or more servers, such as the computing device 204. In another aspect, the content or service provider can operate the distribution system 116 to provide content and other services. Primary content can comprise, for example, television programs, movies, music, and the like. In an aspect, the first device can comprise a smart television, a personal computer, a laptop computer, a tablet computer, a smartphone, a set top box, or the like, such as the display device 121a and/or the user device 202a. For example, a particular user can use a television connected to a set top box as the first device. In an aspect, the provided primary content can comprise one or more portions of primary content. For example, the primary content can be streamed or delivered via file-based transfer, and can be live or time-shifted, such as video-on-demand content. In another aspect the primary content can comprise content recorded or stored locally on the first device. As an example, the primary content can comprise a first portion of primary content and a second portion of primary content wherein an advertisement or other secondary content can ordinarily be provided between the first and second portions of the primary content. In an aspect the secondary content can comprise, for example, interactive and/or non-interactive advertising.

In step 304, a user parameter related to consumption (e.g., where or when to display) of the secondary content can be determined. In an aspect, the user parameter can be determined by the user or the content/service provider. The user parameter can be indicative of a user registering one or more second devices for receipt of secondary content in lieu of the first device. In an aspect, the user parameter can comprise an identifier of a second device, such as the device identifier 208, an indication that the second device is running a particular application, an indication that the second device is active, that video and/or audio are being output (e.g., the device is not muted and/or the brightness is not below a predefined threshold), and the like. In an aspect, the second device can comprise a forward-facing camera, and the device can be deemed to be active when a face is visible on the camera to verify a user is watching the device. In another aspect, the second device can receive a token that is fulfilled once the secondary content has been streamed. As an example, the second device can receive a token (e.g., data) from the content provider. The token can be fulfilled (e.g., deleted from memory) by streaming the secondary content. The second device can be prevented from performing one or more functions while the device contains a predetermined number of unfulfilled tokens. In an aspect, the user parameter can be stored on the first device and/or the second device and transmitted to the content provider in response to a request from the content server. In another aspect, the second device can transmit the user parameter to the content server. In an aspect, the second device can comprise a smart television, a personal computer, a laptop computer, a tablet computer, a smartphone, a set-top box, or other similar device, such as the display device 121b and/or the user device 202b, that is capable of two-way communication with the content provider and/or the first device.

In step 306, secondary content can be provided to the second device instead of the first device based on the user parameter. For example, the user parameter can indicate that when the second device is active, the user prefers to view the secondary content on the second device. In an aspect, the second device can be associated with the user. As an example, the user can be "logged in" to the second device. In an aspect, the secondary content can be provided by the content provider. For example, secondary content (e.g., the secondary content that was initially intended to be displayed in-line between the first and second portions of the primary content) can be transmitted from the content provider directly to the second device instead of transmitting the secondary content to the first device (e.g., based on the user parameter). That is, in response to completion of the first portion of the primary content, the secondary content that was intended for in-line display on the primary device can instead be transmitted to the second device for display. In another aspect, the secondary content can be provided from the first device (e.g., based on the user parameter). For example, the first device can comprise a storage medium, e.g., a buffer, that can process and store primary and secondary content transmitted from the content provider, and the content can comprise an indication (e.g., a timestamp or the like) indicating which portions are primary content and which portions are secondary content. In an aspect, the secondary content can be transmitted from the first device to the second device, e.g., via local wireless network, at an end of a portion of primary content.

In step 308, the content provider can continue to provide primary content to the first device. In an aspect, providing the primary content to the first device can comprise providing the second portion of primary content to the first device immediately following the first portion of primary content, such that there is effectively no gap in displaying the primary content on the first device. As an example, secondary content that was initially intended for in-line display between the first and second portions of the primary content can instead be displayed on the second device, while the first and second portions of primary content are displayed on the first device consecutively, with no break in between. In an aspect, the secondary content can be provided (e.g., transmitted) to the second device while the first portion of the primary content is being displayed on the first device, such that the secondary content is "pre-loaded" on the second device. The secondary content can be displayed using the second device either at the conclusion of the first portion of the primary content or at a later time (e.g., during the second portion of the primary content on the first device, after display of all the portions of primary content on the first device is compete, in response to a user instruction to begin playback, etc.). In another aspect, the content provider can provide (e.g., transmit) the secondary content to the second device and can provide the second portion of the primary content to the first device concurrently. The secondary content can then be displayed on the secondary device either at the same time that the second portion of the primary content is displayed on the primary device, or the secondary content can be stored on the second device for later display (e.g., after all portions of the primary content have been displayed, in response to a user instruction to begin playback, etc.).

Figure 4:
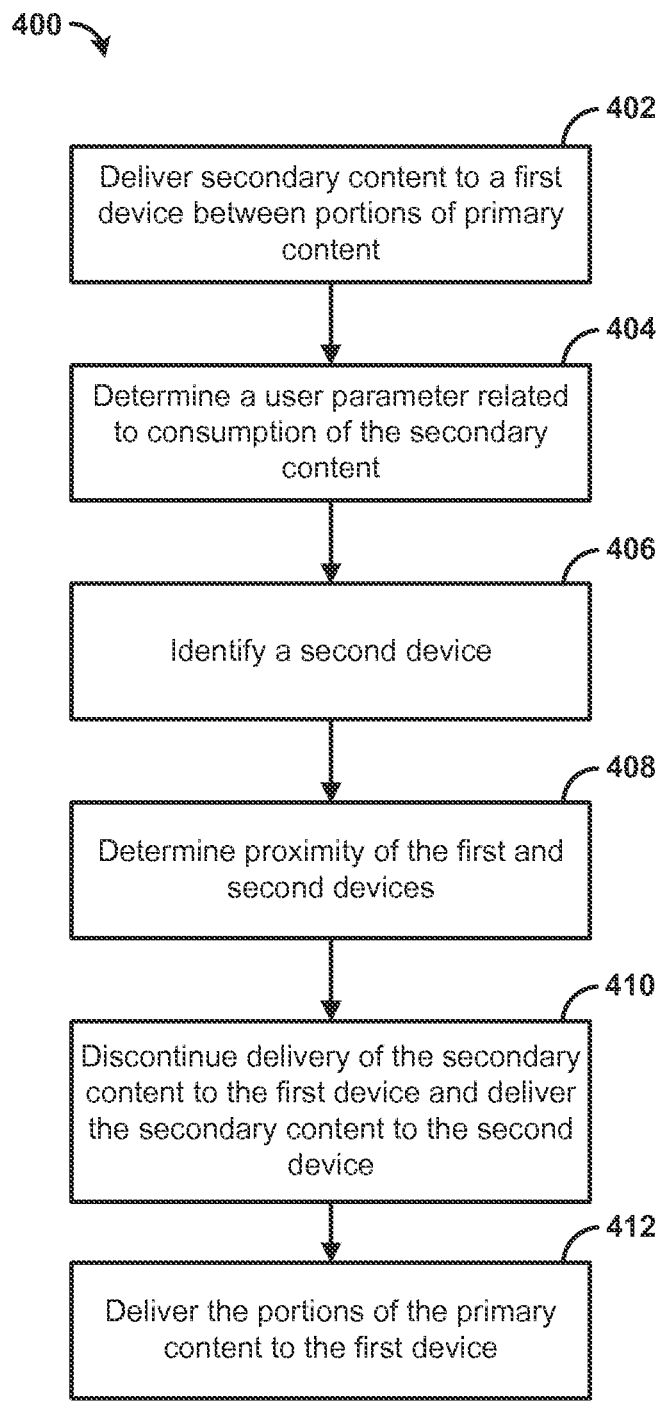
FIG. 4 is a flowchart illustrating another example method.

FIG. 4 is a flowchart illustrating another exemplary method 400. In step 402, a content provider can deliver secondary content to a first device between a first portion of primary content and a second portion of primary content. In an aspect, the content provider can comprise a server, such as the computing device 204. In another aspect, the content provider can comprise the distribution network 116. In an aspect, the first device can comprise the user device 202a or the display 121a. As examples, the first device can comprise a smart television, a personal computer, a laptop computer, a tablet computer, a smartphone, a set-top box, or the like. In an aspect, the primary content can comprise, for example, television programming, movies, music programming, and the like. In an aspect, the secondary content can comprise, for example, advertising content, behind-the-scenes content, or other content related to the primary content.

In step 404, the content provider can determine a user parameter related to consumption, e.g., where and when to display, of the secondary content. The user parameter can be indicative of a user registering one or more second devices for receipt of secondary content in lieu of the first device. In an aspect, the parameter can comprise an identifier of a second device, such as the device identifier 208, an indication that the second device is running a particular application, an indication that the second device is active, that video and/or audio are being output (e.g., the device is not muted and/or the brightness is not below a predefined threshold), and the like. In another aspect, the second device can receive a token that is fulfilled once the secondary content has been streamed. In an aspect, the user parameter can be stored on the first device and/or second device and transmitted to the content provider in response to a request from the content provider. In another aspect, the user parameter can be communicated directly from the second device to the content provider.

In step 406, the content provider can identify the second device based on the user parameter. In an aspect, the second device can be a user device capable of providing audio and/or video to the user based on received content. For example, the second device can comprise the user device 202b or the display 121b. As further examples, the second device can comprise a smart television, a personal computer, a laptop computer, a tablet computer, a smartphone, a set top box, or other similar device capable of two-way communication with the content provider. In an aspect, the content provider can utilize the device identifier 208 provided as the user parameter to identify the second device. For example, the content provider can identify the second device by comparing the provided user parameter (e.g., the device identifier 208) to a database containing one or more known devices for a particular account or premises. Alternatively, the user parameter can comprise, for example, user account information in addition to the device identifier 208. In this case, any device transmitting the user parameter can be marked as a second device for a predefined time period or for the duration of a particular session.

In step 408, the content provider can determine a proximity of the first and second devices. In an aspect, the first device and the second device can be determined to be in proximity when they are connected to the network 205 through the same network device 216. In another aspect, the first device and the second device can be determined to be in proximity when they are both connected to the same HCT 120. In another aspect, the first device and/or the second device can comprise a location tracker, such as a global positioning system receiver, a radio frequency transceiver, or the like. In an aspect, a distance between the first device and the second device can be determined based on determined positions for each of the first device and the second device. As an example, when the distance between the first device and the second device is below a predefined threshold (e.g., 25 feet), the first and second devices can be determined to be in proximity to one another. In an aspect, relatively short range communications such as near-field communications or Bluetooth communications can be used to determine proximity of the first device and the second device. For example, the second device can be paired with the first device via Bluetooth pairing. Since Bluetooth signals have a relatively short range, it can be determined that the second device is in proximity to the first device if the second device is able to successfully pair with the first device using known Bluetooth protocols. For example, a user can select a command on the first device that requests to pair a device (e.g., the second device) with the first device. In response, the first device can provide a list of all devices within range and the user can select the second device from the provided list. The first device can transmit a pairing request to the second device. Optionally, the second device can be prompted to allow the pairing. Also, both the first and second devices can be prompted to add the connection to a list of trusted connections. Alternatively, technologies such as global positioning systems (GPS) can be used to determine the distance between the first device and the second device. For example, the first device can report a location to a server of the content provider. In an aspect, the location of the first device can be reported intermittently. The second device can also report its location to the server of the content provider. In an aspect, the second device can report its location intermittently. The server of the content provider can determine a distance between the first device and the second device based on the reported locations. In another aspect the first device can be used to display a passcode, such as an alphanumeric code, that the user must enter into the second device to confirm that the first device and the second device are in proximity. In still another aspect, device locations can be determined based on IP addresses assigned to each of the first device and the second device.

In step 410, the content provider can discontinue delivery of the secondary content to the first device and deliver the secondary content to the second device. In an aspect, discontinuing the delivery of the secondary content to the first device can be based on a proximity of the second device to the first device. For example, delivery of the secondary content to the first device can be discontinued in response to a determination that a distance between the first device and the second device is less than the predefined threshold distance in step 408. In an aspect, discontinuing delivery of the secondary content to the first device can comprise ceasing transmission of any new portions of secondary content to the first device, such that if any portion of secondary content has already been transmitted or partially transmitted to the first device is transmitted to, and displayed on, the first device, while subsequent portions of secondary content are not transmitted to the first device. In another aspect, discontinuing delivery of the secondary content to the first device can comprise ceasing delivery of the secondary content to the first device substantially immediately, such that if secondary content has been partially transferred to and/or partially displayed on the first device, remaining secondary content is not transmitted to, and is not displayed on, the first device.

In an aspect, the secondary content can be delivered to the second device. In an aspect, delivery of the secondary content to the second device can be based on a proximity of the second device to the first device. For example, delivery of the secondary content to the first device can be discontinued in response to a determination that a distance between the first device and the second device is less than the predefined threshold distance in step 408. In an aspect, the delivery of the secondary content to the second device can also be performed in response to discontinuing delivery of the secondary content to the first device. As an example, instead of displaying secondary content in-line on the first device between portions of primary content, the secondary content can be delivered to the second device for display. In an aspect, the content provider can provide portions of content marked as secondary content (e.g., interactive and/or non-interactive advertising content) to the second device instead of providing the portions of secondary content to the first device. In another aspect, the user can interact with the second device to receive alternate secondary content from the content provider. As an example, the user can select from among a plurality of available secondary content items. The selected secondary content can be delivered to the second device instead of delivering secondary content to the first device. In an aspect, the secondary content can be delivered to the second device prior to the secondary content being rendered (e.g., displayed) on the first device.

In an aspect, the content provider can further determine if the second device is active. For example, the second device can be determined to be active when a display associated with the second device is active. In another aspect, the second device can be determined to be active when a particular application is installed and running on the second device. In an aspect, the second device can be deemed to be active when video and/or audio are being output at the second device (e.g., the device is not muted and/or the brightness is not below a predefined threshold). In another aspect, the second device can comprise a forward-facing camera, and the second device can be deemed to be active when a face is visible on the camera to verify a user is watching the device.

In step 412, the content provider can deliver portions of the primary content to the first device for display. For example, a first portion of primary content and a second portion of primary content can be provided to the first device such that the first device can display the first portion of primary content and the second portion of primary content. Typically, the first and second portions of primary content would be separated by an in-line portion of secondary content (e.g., a commercial break). However, because the secondary content can be delivered to the second device in step 410, such a separation is no longer required. In an aspect, the second portion of primary content can be displayed on the first device immediately following the first portion of primary content. In another aspect, additional primary content can be displayed in place of the secondary content. For example, if the primary content is a live event, such as a sporting event, and the secondary content is advertising content associated with the sporting event, then during an advertising break (e.g., during a time-out) the content provider can continue delivering the primary content to the first device, while the secondary content is delivered to the second device.

In an aspect, the second device can transmit a secondary content display acknowledgement signal to the content provider when display of secondary content is complete. In an aspect, the secondary content display acknowledgement message can comprise information sufficient to identify the device that displayed the secondary content and indicate that the secondary content was displayed in its entirety. For example, the secondary content display acknowledgement message can comprise a device ID, session ID, and a flag indicating that the secondary content was displayed in its entirety. In an aspect, the content provider can wait until a predefined time period has lapsed to receive the secondary content display acknowledgement message. For example, if a length of the secondary content is known, the length of the predefined time period the content provider can wait to receive the secondary content display acknowledgement signal can be selected based on the length of the secondary content. If the secondary content display acknowledgement signal is not received within the predefined time period, the content provider can inject the secondary content into the primary content provided to the first device.

Figure 5:
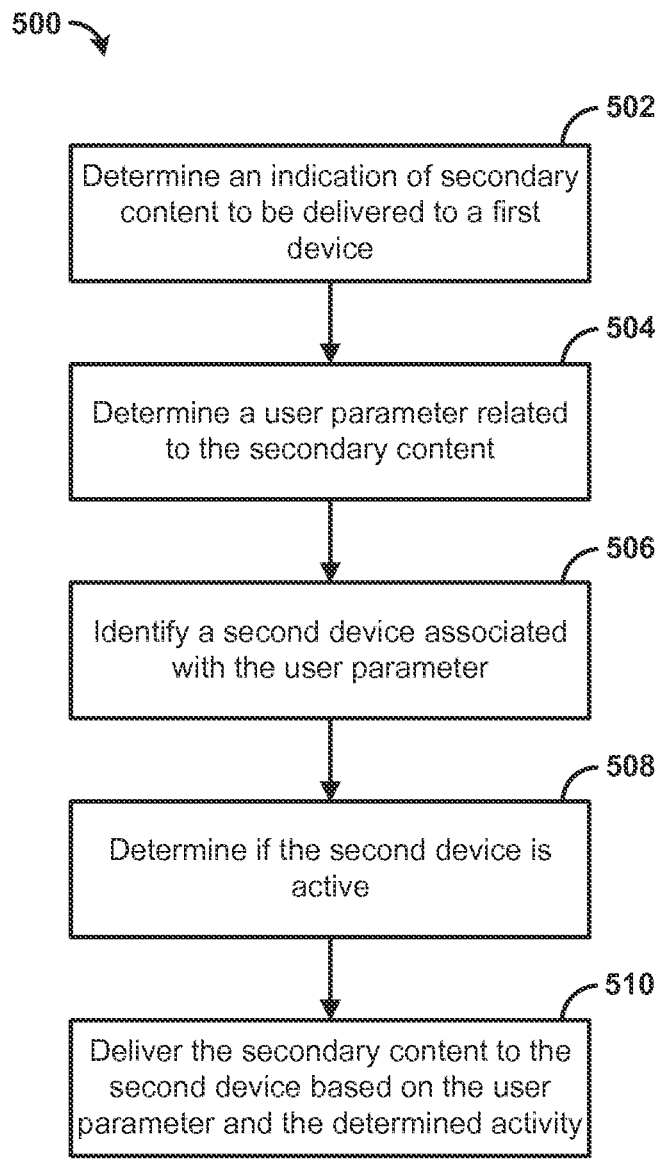
FIG. 5 is a flowchart illustrating another example method.

FIG. 5 shows another example method 500. In step 502, a content provider can determine an indication that secondary content is to be delivered to a first device. In an aspect, the content provider can comprise a server, such as the computing device 204. In another aspect, the content provider can comprise the distribution network 116. In an aspect, the first device can comprise the user device 202*a* or the display 121*a*. As examples, the first device can comprise a smart television, a personal computer, a laptop computer, a tablet computer, a smartphone, a set-top box, or the like. The indication can comprise a flag or other electronic signal stored as part of primary content. The indication can comprise one or more SCTE-35 signals and the like. In another aspect, the indication can comprise a beginning or end of a portion of primary content. In an aspect, the primary content can comprise, for example, television programming, movies, music programming, and the like.

In step 504, the content provider can determine a user parameter related to display of secondary content. The user parameter can be indicative of a user registering one or more second devices for receipt of secondary content in lieu of the first device. In an aspect, the user parameter can comprise an identifier of a second device, such as the device identifier 208, an indication that the second device is running a particular application, an indication that the second device is active, that video and/or audio are being output (e.g., the device is not muted and/or the brightness is not below a predefined threshold), and the like. In another aspect, the second device can receive a token that is fulfilled once the secondary content has been streamed. In an aspect, that user parameter can be stored on the first device and transmitted to the content server in response to a request from the content server. In another aspect, the user parameter can be communicated directly from the second device to the content provider, or can be stored by the content provider.

In step 506, the content provider can identify the second device based on the user parameter. In an aspect, the second device can be a user device capable of providing audio and/or video to the user based on received content. For example, the second device can comprise the user device 202*b* or the display 121*b*. As examples, the second device can comprise a smart television, a personal computer, a laptop computer, a tablet computer, a smartphone, a set-top box, or other similar device capable of two-way communication with the content provider. In an aspect, the content provider can utilize the device identifier 208 provided as the user parameter to identify the second device. For example, the content provider can identify the second device by comparing the provided user parameter (e.g., the device identifier 208) to a database containing one or more known devices for a particular account. Alternatively the user parameter can comprise, for example, user account information in addition to the device identifier 208. In this case, any device transmitting the user parameter can be designated as a second device for a predefined time period or for the duration of a particular session.

In step 508, the content provider can determine if the second device is active. For example, the second device can be determined to be active when a display associated with the second device is active. In another aspect, the second device can be determined to be active when a particular application is installed and running on the second device. In an aspect, the second device can be deemed to be active when video and/or audio are being output at the second device (e.g., the device is not muted and/or the brightness is not below a predefined threshold). In another aspect, the second device can comprise a forward-facing camera, and the second device can be deemed to be active when a face is visible on the camera to verify a user is watching the device.

In step 510, secondary content can be delivered to the second device in lieu of being delivered to the first device based on the user parameter and the determination that the second device is active. As an example, instead of displaying secondary content in-line on the first device between portions of primary content, the secondary content can instead be delivered to the second device. In an aspect, the content provider can provide portions of content marked as secondary content (e.g., interactive and/or non-interactive advertising content) to the second device instead of providing the secondary content to the first device. In an aspect, the user can interact with the second device to receive alternate secondary content from the content provider. As an example, the user can select from among a plurality of available secondary content items. In another aspect, secondary content is selected based on subjected matter of the primary content. The selected secondary content can be delivered to the second device instead of delivering secondary content to the first device.

In an aspect, the content provider can also determine a proximity of the first and second devices. In an aspect, the first device and the second device can be determined to be in proximity when they are connected to the network 205 through the same network device 216. In another aspect, the first device and the second device can be determined to be in proximity when they are both connected to the same HCT 120. In another aspect, the first device and/or the second device can comprise a location tracker, such as a global positioning system receiver, a radio frequency transceiver, or the like. In an aspect, a distance between the first device and the second device can be determined based on determined positions for each of the first device and the second device. As an example, when the distance between the first device and the second device is below a predefined threshold (e.g., 25 feet), the first and second devices can be determined to be in proximity to one another. In an aspect, relatively short range communications such as near-field communications or Bluetooth communications can be used to determine proximity of the first device and the second device. In another aspect the first device can be used to display a passcode, such as an alphanumeric code, that the user must enter into the second device to confirm that the first device and the second device are in proximity. In still another aspect, device locations can be determined based on IP addresses assigned to each of the first device and the second device.

In an aspect, the second device can transmit a secondary content display acknowledgement signal to the content provider when display of secondary content is complete. In an aspect, the secondary content display acknowledgement message can comprise information sufficient to identify the device that displayed the secondary content, and indicate that the content was displayed in its entirety. For example, the secondary content display acknowledgement message can comprise a device ID, session ID, and a flag indicating that the secondary content was displayed in its entirety. In an aspect, the content provider can wait until a predefined time period has lapsed to receive the secondary content display acknowledgement message. For example, if a length of the secondary content is known, the length of the predefined time period the content provider can wait to receive the secondary content display acknowledgement signal can be selected based on the length of the secondary content. If the secondary content display acknowledgement signal is not received within the predefined time period, the content provider can inject the secondary content into the primary content provided to the first device.

Figure 6:
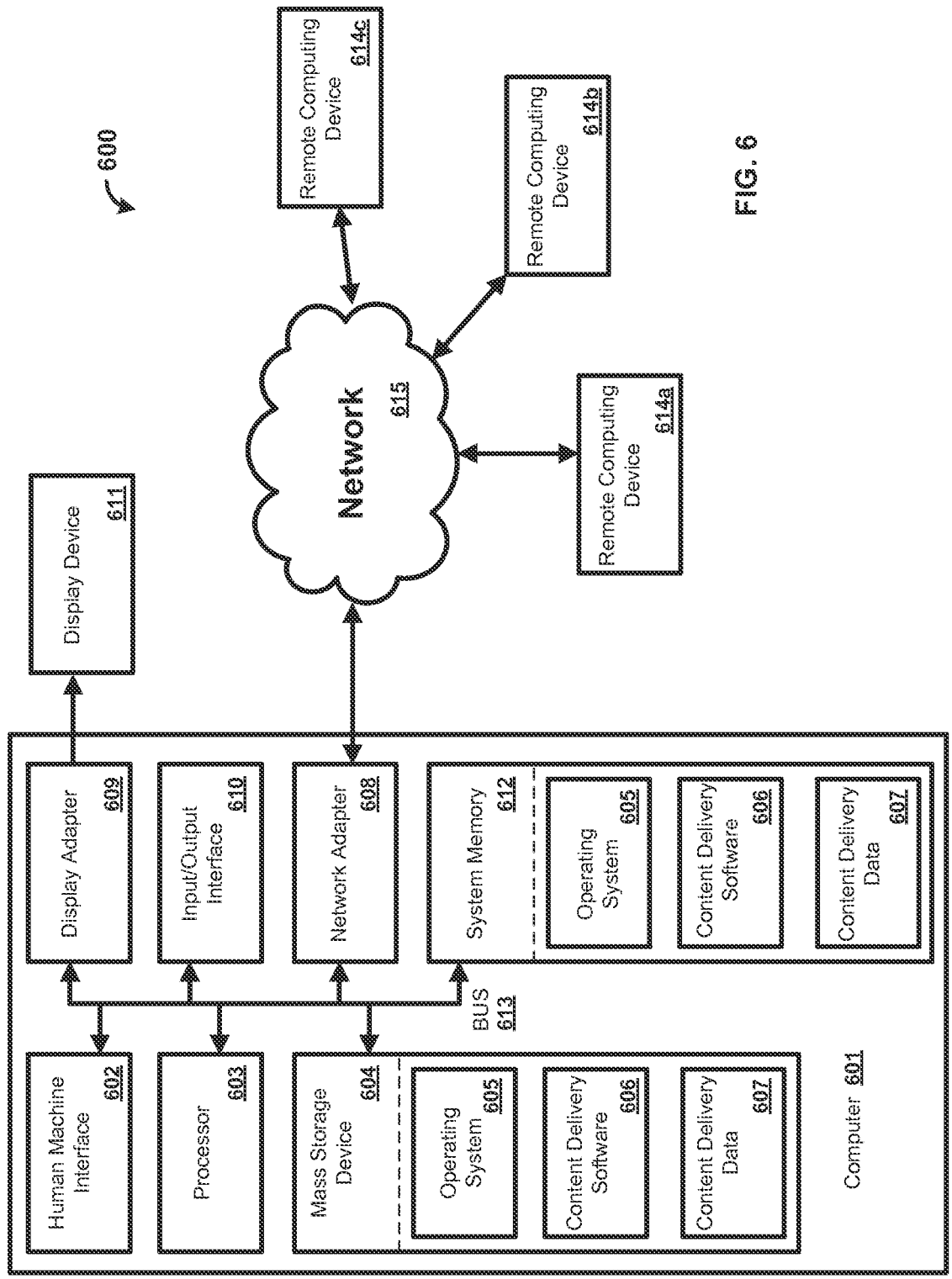
FIG. 6 is a block diagram illustrating an example computing device.

In an exemplary aspect, the methods and systems can be implemented on a computer 601 as illustrated in FIG. 6 and described below. By way of example, the computing device 204 of FIG. 2 can be a computer 601 as illustrated in FIG. 6. Similarly, the methods and systems disclosed can utilize one or more computers to perform one or more functions in one or more locations. FIG. 6 is a block diagram illustrating an exemplary operating environment 600 for performing the disclosed methods. This exemplary operating environment 600 is only an example of an operating environment and is not intended to suggest any limitation as to the scope of use or functionality of operating environment architecture. Neither should the operating environment 600 be interpreted as having any dependency or requirement relating to any one or combination of components illustrated in the exemplary operating environment 600.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage content including memory storage devices.

Further, one skilled in the art will appreciate that the systems and methods disclosed herein can be implemented via a general-purpose computing device in the form of a computer 601. In an aspect, the compute 601 can serve as the content provider. The computer 601 can comprise one or more components, such as one or more processors 603, a system memory 612, and a bus 613 that couples various components of the computer 601 including the one or more processors 603 to the system memory 612. In the case of multiple processors 603, the operating environment 600 can utilize parallel computing.

The bus 613 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and one or more of the components of the computer 601, such as the one or more processors 603, a mass storage device 604, an operating system 605, content providing software 606, content providing data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable content. Exemplary readable content can be any available content that is accessible by the computer 601 and comprises, for example and not meant to be limiting, both volatile and non-volatile content, removable and non-removable content. The system memory 612 can comprise computer readable content in the form of volatile memory, such as random access memory (RAM), and/or non-volatile memory, such as read only memory (ROM). The system memory 612 typically can comprise data such as content delivery data 607 and/or program modules such as operating system 605 and content delivery software 606 that are content accessible to and/or are operated on by the one or more processors 603.

In another aspect, the computer 601 can also comprise other removable/non-removable, volatile/non-volatile computer storage content. The mass storage device 604 can provide non-volatile storage of computer code, computer readable instructions, data structures, program modules, and other data for the computer 601. For example, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and content delivery software 606. The content delivery data 607 can also be stored on the mass storage device 604. Content delivery data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 615.

In an aspect, the user can enter commands and information into the computer 601 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 603 via a human machine interface 602 that is coupled to the bus 613, but can be connected by other interface and bus structures, such as a parallel port, game port, an IEEE 1394 Port (also known as a Firewire port), a serial port, network adapter 608, and/or a universal serial bus (USB).

In yet another aspect, a display device 611 can also be connected to the bus 613 via an interface, such as a display adapter 609. It is contemplated that the computer 601 can have more than one display adapter 609 and the computer 601 can have more than one display device 611. For example, a display device 611 can be a monitor, an LCD (Liquid Crystal Display), light emitting diode (LED) display, television, smart lens, smart glass, and/or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device 614a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 601 and a remote computing device 614a,b,c can be made via a network 615, such as a local area network (LAN) and/or a general wide area network (WAN). Such network connections can be through a network adapter 608. The network adapter 608 can be implemented in both wired and wireless environments. Such networking environments are conventional and commonplace in dwellings, offices, enterprise-wide computer networks, intranets, and the Internet. In an aspect, the remote computing devices 614*a,b,c* can serve as first and second devices for displaying content. For example, the remote computing device 614*a* can be a first device for displaying portions of primary content, and one or more of the remote computing devices 614*b,c* can be a second device for displaying secondary content. As described above, the secondary content is provided to the second device (i.e., one or more of the remote computing devices 614*b,c*) in lieu of providing the secondary content to the first device (i.e., the remote computing device 614*a*). This allows the first device to display multiple portions of primary content contiguously, without in-line breaks for secondary content.

For purposes of illustration, application programs and other executable program components such as the operating system 605 are illustrated herein as discrete blocks, although it is recognized that such programs and components can reside at various times in different storage components of the computing device 601, and are executed by the one or more processors 603 of the computer 601. An implementation of content delivery software 606 can be stored on or transmitted across some form of computer readable content. Any of the disclosed methods can be performed by computer readable instructions embodied on computer readable content. The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    sending, from a computing device to a first device, primary content comprising an indication of an insertion opportunity;
    determining, based on the indication of the insertion opportunity, a proximity of a second device to the first device and a content output setting associated with the second device;
    sending, from the computing device to the second device, based on the proximity of the second device to the first device and the content output setting associated with the second device, secondary content associated with the insertion opportunity; and
    based on lack of receipt of an acknowledgment message from the second device indicating that the secondary content was displayed in its entirety within a predefined time period, inserting the secondary content into the primary content, wherein the predefined time period is based on a length of the secondary content.

2. The method of claim 1, further comprising sending, to the first device, the secondary content, wherein at least one of the primary content and the secondary content is stored locally on the first device.

3. The method of claim 2, wherein sending the secondary content to the second device comprises sending the secondary content to the second device from the first device.

4. The method of claim 2, wherein sending the secondary content to the second device comprises sending the secondary content to the second device from a content server.

5. The method of claim 1, wherein the secondary content comprises advertising content.

6. The method of claim 1, wherein the secondary content is related to the primary content.

7. The method of claim 1, wherein sending the secondary content to the second device comprises sending the secondary content to the second device from the first device via a Bluetooth communication protocol.

8. The method of claim 1, wherein the first device comprises a set top box and wherein the second device comprises a mobile device.

9. The method of claim 1, wherein the indication of the insertion opportunity comprises at least one of: a beginning portion of primary content, an ending portion of primary content, or an SCTE-35 marker.

10. The method of claim 1, wherein the content output setting associated with the second device comprises at least one of: an indication that the second device is running a content output application, an indication that the second device is presently outputting one or more of video content or audio content, an indication of a volume level associated with the second device, or an indication of a screen brightness level associated with the second device.

11. A method comprising:
    sending, from a computing device to a first device, secondary content associated with an indication of an insertion opportunity in primary content sent to a second device;
    determining, based on the indication of the insertion opportunity, a content output setting of the second device and a proximity of the second device to the first device;
    based on the proximity of the second device, discontinuing sending the secondary content to the first device;
    causing, based on the content output setting and the proximity, the secondary content to be sent, from the first device to the second device; and
    based on lack of receipt of an acknowledgment message received from the second device indicating that the secondary content was displayed in its entirety within predefined time period, inserting the secondary content into the primary content, wherein the predefined time period is based on a length of the secondary content.

12. The method of claim 11, further comprising:
causing output of the secondary content; and
receiving, from the second device, the acknowledgment message indicating that the secondary content was displayed in its entirety.

13. The method of claim 12, wherein the acknowledgment message includes a flag indicating that the secondary content was displayed in its entirety.

14. The method of claim 11, further comprising sending, to the first device instead of the second device, the secondary content when the proximity is determined to exceed a predetermined threshold.

15. The method of claim 11, further comprising determining that the second device is active; and wherein sending the secondary content to the second device is further based on the second device being active.

16. The method of claim 11, further comprising:
receiving a user input at the second device; and
sending, based on the user input, alternate secondary content to the second device.

17. The method of claim 11, wherein the content output setting indicates the second device is in use.

18. The method of claim 11, wherein the second device is associated with at least one of: a device identifier, a device registration, a user account, a user setting, a content display time, or a content display location.

19. A method comprising:
determining, in primary content to be sent from a computing device to a first device, an indication of an insertion opportunity in the primary content;
based on the indication of the insertion opportunity, determining secondary content and a content output setting associated with a second device;
causing, based on the content output setting associated with the second device, the computing device to send the secondary content to the second device; and
based on lack of receipt of an acknowledgment message received from the second device indicating that the secondary content was displayed in its entirety within predefined time period, inserting the secondary content into the primary content, wherein the predefined time period is based on a length of the secondary content.

20. The method of claim 19, wherein the indication of the insertion opportunity comprises at least one of: a beginning portion of primary content, an ending portion of primary content, or a SCTE-35 marker.

21. The method of claim 19, further comprising:
causing the secondary content to be output on the second device; and
receiving, from the second device, the acknowledgment message indicating that the secondary content was displayed in its entirety.

22. The method of claim 21, wherein the acknowledgment message includes a flag indicating that the secondary content was displayed in its entirety.

23. The method of claim 19, further comprising determining the second device is within a predetermined proximity to the first device.

24. The method of claim 19, further comprising:
receiving a user input at the second device; and
sending, based on the user input, alternate secondary content to the second device.

25. The method of claim 19, wherein the secondary content is selected based on the primary content.

26. The method of claim 19, wherein the content output setting comprises at least one of: an indication that the second device is running a content output application, an indication that the second device is presently outputting one or more of video content or audio content, an indication of a volume level associated with the second device, or an indication of a screen brightness level associated with the second device.

* * * * *